United States Patent

Briles

[15] 3,680,429

[45] Aug. 1, 1972

[54] SELF-GAUGING, INTERFERENCE FIT RIVET

[72] Inventor: Franklin S. Briles, 6 Middle Ridge Lane, Rolling Hills, Calif. 90274

[22] Filed: March 17, 1970

[21] Appl. No.: 20,220

[52] U.S. Cl..................................85/37, 287/189.36
[51] Int. Cl...............................................F16h 19/04
[58] Field of Search..................85/37, 38, 39, 1 P, 1; 287/189.36 F

[56] References Cited

UNITED STATES PATENTS

| | | | |
|---|---|---|---|
| 3,359,847 | 12/1967 | Richmond | 85/37 |
| 3,396,996 | 8/1968 | Raptis | 287/189.36 F |
| 3,578,367 | 5/1971 | Harvill | 85/1 |

FOREIGN PATENTS OR APPLICATIONS

| | | | |
|---|---|---|---|
| 614,838 | 2/1961 | Canada | 287/189.36 F |
| 679,962 | 8/1939 | Germany | 85/37 |

OTHER PUBLICATIONS

Page 20 of John Hassal, Inc. Catalog No. 50 copyright 1946

*Primary Examiner*—Marion Parsons, Jr.
*Attorney*—White & Haefliger

[57] ABSTRACT

A self-gauging, interference fit rivet, comprises:

a. a head and a shank protruding therefrom, b. the shank having, along its length in a direction away from the head, a sequence of progressively reduced diameter sections, the smallest section to fit freely within a work bore and the largest section to resist complete insertion of the rivet in the bore by interference engagement with the work surrounding the bore, c. there being an elongated mid-section between said largest and smallest sections for centering the rivet in the bore through slight interference therewith, d. said shank largest section being capable of forced insertion relatively into the bore to enable closure of the head toward the work and to pre-stress the work around the bore, and e. said smallest section of the rivet being sized to be upset for forming a retaining flange at the side of the work opposite the head.

3 Claims, 5 Drawing Figures

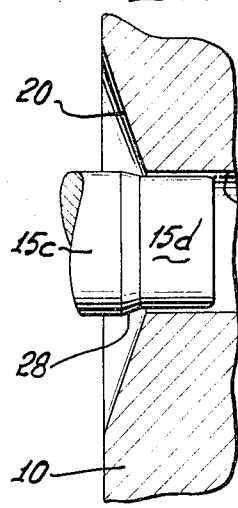
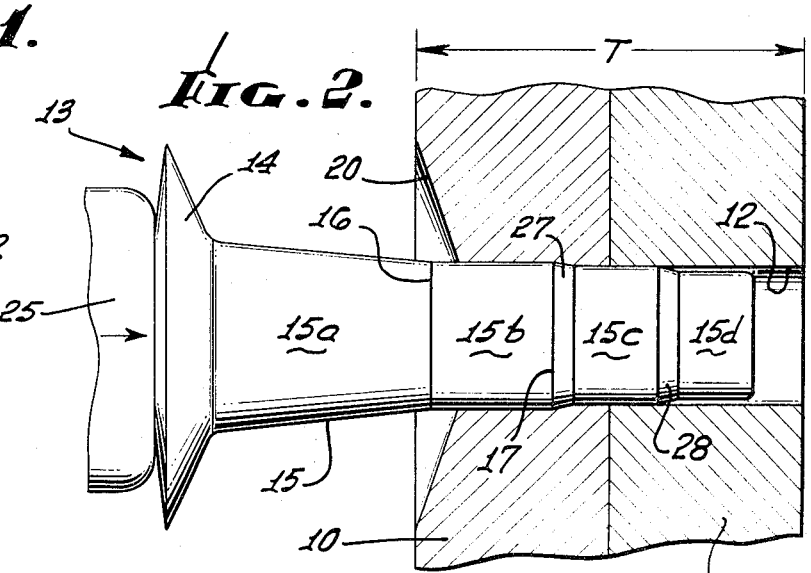
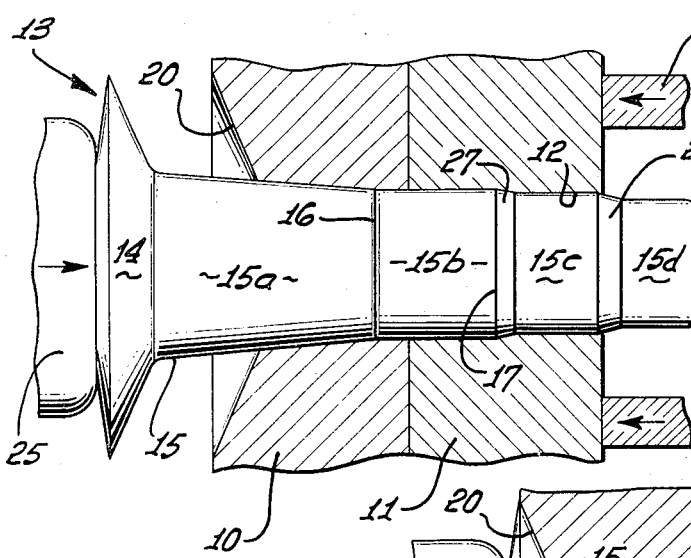
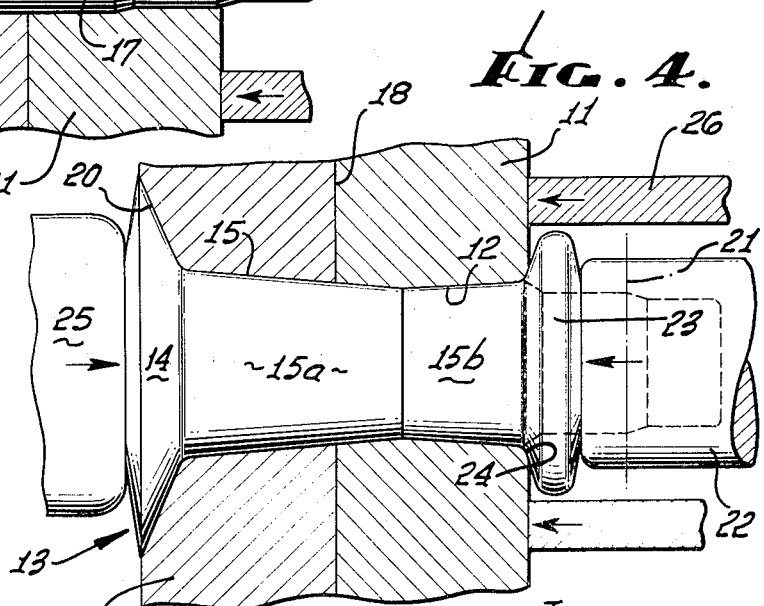
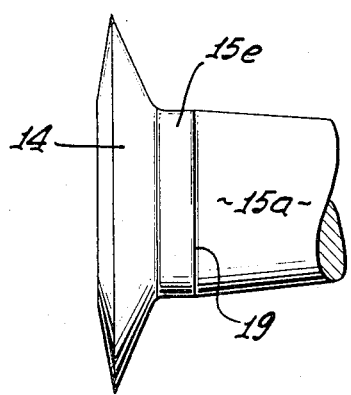
INVENTOR.
FRANKLIN S. BRILES
BY White & Haefliger
ATTORNEYS.

SELF-GAUGING, INTERFERENCE FIT RIVET

BACKGROUND OF THE INVENTION

This invention relates generally to fasteners, and more particularly concerns improvements in rivet type fasteners having a number of unusual advantages in construction, mode of installation and operation.

Desirably, rivet type fasteners for retaining thin panels such as aircraft skins in assembled relation should offer the following advantages and characteristics: maximum tension in the rivet; minimum distortion of the lip of the panel bore adjacent the rivet upset; controlled interference of the rivet and bore during rivet insertion to pre-stress the work about the bore without galling the bore, as well as providing for piloting of the rivet during such insertion; maximum shear strength of the rivet at the location of the interface of the two panels or skins (i.e. up to 100,000 psi); sufficient rivet ductility to facilitate upsetting with small, light weight tools or guns so as to minimize noise and reduce inadvertent damage to the panel or skin; and other advantages as will appear. In the past, rivets designed to hold aluminum aircraft skins in assembled relation have lacked one or more of the above advantages, resulting in the existence of undesirable problems needing solution. For example, harder rivets consisting of titanium alloy and offering high fatigue strength cannot satisfactorily be upset at both ends, as was customary with prior rivets.

SUMMARY OF THE INVENTION

It is a major object of the invention to provide solutions to the above problems through the provision of a rivet incorporating a number of unusual advantages. Basically, the rivet comprises a head and a protruding shank having along its length a sequence of progressively reduced diameter sections, the smallest of which will fit freely within a drilled hole in work and the largest of which resists complete insertion of the rivet in the bore by interference with the work surrounding the bore; there being an elongated mid-section between the largest and smallest sections for centering the rivet in the bore through slight interference with same; the shank largest section being capable of forced insertion relatively into the bore to enable closure of the head toward the work and to pre-stress the work around the bore, and the smallest section of the rivet being sized to be upset for forming a retaining flange at the work side opposite the head. Accordingly, the functions of hole gauging, rivet piloting and centering, metal-to-metal contacting, and work pre-stressing are performed by the rivet during its insertion; it is readily upset without undesirable distortion of the bore lip; and as will be seen it affords high rivet shear strength, high work fatigue strength, and the rivet does not gall the bore during insertion.

Additional objects and advantages include the extension of shank taper to a location part way through the bore, and preferably beyond an interface formed by two work panels; the provision of interference between the bore as initially formed and a shank section immediately forward of the taper, such interference typically being between 0.001 and 0.006 inch for bore lengths between ⅛ and 1 inch; the provision of interference within the range 0.005 and 0.009 inch between the initially formed bore and the taper largest diameter; the provision of a riveted connection with rivet shank sections tapered in opposite directions to enable reduction of rivet weight, the provision of taper of approximately 0.250 inch per foot of section length; and the provision of such a rivet consisting of titanium alloy, or essentially of titanium.

These and other objects and advantages of the invention, as well as the details of illustrative embodiments, will be more fully described in the following specification relating to the drawings, in which:

DRAWING DESCRIPTION

FIG. 1 is an elevation, taken in section, showing initial insertion of a rivet shank into a workpiece;

FIG. 2 and 3 are views like Fig. 1, but showing intermediate stages of rivet insertion;

Fig. 4 is a view like Fig. 1, but showing completion of riveting; and

Fig. 5 shows a modified rivet construction.

DETAILED DESCRIPTION

The workpiece in the drawings includes two panels 10 and 11 into which a straight, i.e. non-tapered cylindrical bore 12 has been drilled or otherwise formed, as seen in Fig. 1. A self-gauging, interference fit rivet 13 has a head 14 and shank 15 protruding from the head. Along its length the shank has, in a direction away from head 14, a sequence of progressively reduced diameter sections 15a, 15b, 15c and 15d.

The smallest section i.e. section 15d, operates as a pilot device in that unless it is initially freely insertible in the bore 12, the latter is immediately known to be too small. Fig. 1 shows this condition. A mid-section 15c on the other hand operates as a self-centering and gauging device in that unless its insertion into the bore is stopped the bore is immediately known to be too large. In this regard, the pilot section diameter is slightly less than the bore diameter, as for example between 0.000 and 0.005 inch less. On the other hand, the diameter of section 15c is typically nominally the same as the bore diameter, and as an example a slight diametral interference between the two may typically lie between 0.0001 and 0.0030 inch. Typically, the diameter of bore 12 may lie between 0.125 and 0.375 inch; and the overall length dimension T of the hole in panels 10 and 11 may lie between ⅛ and 1 inch.

The shank "grip" is produced by the largest and tapered section 15a, and may also be produced by another mid-section 15b, the locus of intersection 16 between sections 15a and 15b being variable so that the taper may for example extend throughout the length of section 15b, i.e. to locus 17. Section 15a is capable of forced insertion relatively into the hole to enable closure of the head 14 toward the work and also to pre-stress the work material about the hole into which the section 15a penetrates, with only slight cold working of that material to prevent galling. Typically, the tapered section 15a penetrates into the hole in both panels 10 and 11 to prestress all of the work material about the hole in panel 10, and to pre-stress the material about at least a portion of the length of the hole in panel 11, as seen in Fig. 4. Also, section 15a transmits loading to the work, enabling use of a smaller size head, with weight reduction.

The shank at the forward end of the taper, as for example grip section 15b, may typically have diametral interference with the bore within the range 0.001 to 0.006 inch, about 0.004 being preferred. On the other hand, the maximum diametral interference of the tapered section 15a and the bore 12 is typically within the range 0.005 and 0.009, for producing high fatigue strength in the panel material immediately surrounding the rivet grip by pre-stressing thereof. That material may as an example comprise aircraft skin, say 7075 T 6 aluminum, or titanium, or stainless steel, whereas the rivet may consist of titanium alloy (for example Beta III), giving higher allowable shear strength at the interface 18 between the panels or skins. The taper of section 15a is typically about 0.250 inch per foot of section length, to assure absence of galling and produce high fatigue strength in the work.

Fig. 5 shows the alternate provision of a short cylindrical "grip" section 15e between the head 14 and the beginning of the taper 15a at locus 19. The diameter of section 15e is approximately the maximum diameter of tapered section 15a, and allows for elongation of the rivet, for longer holes. The rivet head in the drawings is sharply tapered to seat in the matching tapered counterbore 20 formed in panel 10. At the opposite end of the rivet, the pigtail section 15d and part of section 15c may be cut off or otherwise removed following complete insertion of the rivet as seen in Fig. 4. Plane 21 indicates the location at which the cut-off may be made, prior to upsetting of the rivet.

Upsetting may be produced as by means of a tool 22 striking the cut-off end of the rivet, to produce the flange or upset 23 tightly engaging the face 24 of the work to hold the rivet in place. Preliminary bucking of the rivet to drive it home may be effected by a tool indicated at 25 as engaging the rivet head. A suitable back-up tool 26 may be held against the panel 11 during such bucking.

Finally, it will be noted that the tapered step shoulders 27 and 28 between the sections 15b and 15c, and the sections 15c and 15d are angled at a shallow angle (not more than about 15°) so as to preclude galling of the bore in the work during rivet installation.

Fig. 4 also shows that the upsetting to produce flange 23 may deform the rivet section 15b to expand it as well as the bore 12 to compressively deform the latter and provide reverse taper (i.e. flare toward flange 23) along the section 15b and the bore. Therefore the sizes of both head 14 and flange 23 may be significantly reduced since endwise loading is transferred to the panels 10 and 11 by reversely tapered sections 15a and 15b as well as by the head and flange. This results in significant weight reduction of each rivet, a very desirable goal in aircraft production. Also, desirable metal-to-metal contact exists between the rivet sections 15a and 15b and the work, and also between the head and flange and the work.

In addition, upsetting of the rivet to form flange 23 may be carried out to compressively one-load the panels or skins 10 and 11, and the resulting combination may be characterized by higher shear and fatigue strength of the rivet.

I claim: interference

1. A self-gauging, interference fit rivet, comprising
   a. a head and a shank protruding therefrom,
   b. the shank having, along its length in a forward direction away from the head, a sequence of progressively reduced diameter sections, the forwardmost and smallest section to fit freely within a work bore and the rearwardmost and largest section to resists complete insertion of the rivet in the bore by interference engagement with the work surrounding the bore,
   c. there being an elongated first mid-section between said largest and smallest sections for centering the rivet in the bore through slight interference therewith,
   d. said shank largest section being capable of forced insertion relatively into the bore to enable closure of the head toward the work and to pre-stress the work around the bore,
   e. said smallest section of the rivet being unthreaded and sized to be upset for forming a retaining flange at the side of the work opposite the head
   f. and there being a second elongated mid-section between said shank largest section and said first mid-section, the first mid-section having a diameter providing less interference with the bore than is provided by the second mid-section diameter, the rivet shank largest section tapering toward said second mid-section, and there being a forwardly tapering annular step shoulder between said first and second mid-sections.

2. The rivet of claim 1 wherein said shank has an annular step shoulder between said first mid-section and said forwardmost and smallest section.

3. The rivet of claim 1 including the work and wherein the shank second mid-section immediately forward of said largest section is sized to have interference with said bore within the range 0.001 to 0.006 inch, and the shank first mid-section is sized to have interference with the bore between 0.0001 and 0.003 inch.

* * * * *